US008185720B1

(12) United States Patent
Ansari et al.

(10) Patent No.: US 8,185,720 B1
(45) Date of Patent: May 22, 2012

(54) PROCESSOR BLOCK ASIC CORE FOR EMBEDDING IN AN INTEGRATED CIRCUIT

(75) Inventors: Ahmad R. Ansari, San Jose, CA (US); Jeffery H. Appelbaum, San Mateo, CA (US); Kam-Wing Li, San Jose, CA (US); James J. Murray, Lost Gatos, CA (US); Kathryn S. Purcell, Mountain View, CA (US); Alex S. Warshofsky, Miami Beach, FL (US)

(73) Assignee: Xilinx, Inc., San Jose, CA (US)

( * ) Notice: Subject to any disclaimer, the term of this patent is extended or adjusted under 35 U.S.C. 154(b) by 770 days.

(21) Appl. No.: 12/043,097

(22) Filed: Mar. 5, 2008

(51) Int. Cl.
*G06F 15/76* (2006.01)

(52) U.S. Cl. .......................................... 712/28; 712/220

(58) Field of Classification Search .................... 712/10, 712/11, 28, 220
See application file for complete search history.

(56) References Cited

U.S. PATENT DOCUMENTS

| | | | | |
|---|---|---|---|---|
| 4,973,956 | A * | 11/1990 | Lin et al. ........................ | 340/2.2 |
| 5,493,643 | A * | 2/1996 | Soderberg et al. ............. | 345/505 |
| 6,611,879 | B1 * | 8/2003 | Dobecki ............................ | 710/1 |
| 6,782,336 | B2 * | 8/2004 | Shah ............................ | 702/118 |
| 6,892,259 | B2 * | 5/2005 | Goodrum et al. ............. | 710/244 |
| 2002/0169938 | A1 * | 11/2002 | Scott et al. .................... | 711/207 |
| 2002/0172199 | A1 * | 11/2002 | Scott et al. .................... | 370/389 |
| 2003/0060995 | A1 * | 3/2003 | Shah ............................ | 702/118 |
| 2003/0065847 | A1 * | 4/2003 | Goodrum et al. ............. | 710/113 |
| 2004/0225765 | A1 * | 11/2004 | Greer ............................. | 710/52 |
| 2006/0282588 | A1 * | 12/2006 | Proujansky-Bell ........... | 710/240 |

OTHER PUBLICATIONS

UG200 (v1.1), "Embedded Processor Block in Virtex-5 FPGAs", Mar. 31, 2008, 327 pages, Xilinx, Inc. 2100 Logic Drive, San Jose, CA 95124.
UG200 (v1.0) "Embedded Processor Block in Virtex-5 FPGAs", Jan. 15, 2008, 323 pages, Xilinx, Inc. 2100 Logic Drive, San Jose, CA 95124.

* cited by examiner

*Primary Examiner* — Aimee Li
(74) *Attorney, Agent, or Firm* — W. Eric Webostad; Kevin T. Cuenot (57) ABSTRACT

A hardwired core is embedded in an integrated circuit having programmable circuitry. The hardwired core has a microprocessor; a crossbar interconnect coupled to processor local buses of the microprocessor; and a memory controller interface coupled to the crossbar interconnect. The crossbar interconnect provides pipelines for coupling the hardwired core to the programmable circuitry. The microprocessor, the crossbar interconnect, and the memory controller interface are all capable of operating at a first frequency of operation, and the memory controller interface is further capable of being set to operate at a second frequency of operation having an integer ratio with respect to the first frequency of operation. The crossbar interconnect is configured to direct transactions initiated by the microprocessor to the memory controller interface for accessing one or more memory devices coupled to the memory controller interface via a memory controller. Additional or other interfaces may be coupled to the crossbar interconnect.

20 Claims, 6 Drawing Sheets

PROCESSOR BLOCK ASIC CORE FOR EMBEDDING IN AN INTEGRATED CIRCUIT

FIELD OF THE INVENTION

The invention relates to integrated circuit devices ("ICs"). More particularly, one or more aspects generally relate to a processor block Application Specific Integrated Circuit ("ASIC") core for embedding in an IC having programmable logic.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters such as latency, transistor gate delay, data throughput, and the like designed into the embedded processors may be assumed to be present in the environment to which the embedded processors are to be coupled. Thus even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as before, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. Hardening a circuit instantiated in FPGA fabric generally means replacing or bypassing configuration memory cells with hard-wired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging, and thus yield for such ASICs may be relatively low as compared to yield of FPGAs. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs may perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design. This loss of flexibility combined with the fact that such ASIC core memory controllers or peripherals implemented in FPGA fabric may make FPGAs less attractive to users.

Accordingly, it would be desirable and useful to enhance performance of FPGAs without a significant loss of design flexibility associated with adding ASIC cores for memory controllers or peripherals.

SUMMARY OF THE INVENTION

One or more aspects generally relate to a processor block Application Specific Integrated Circuit ("ASIC") core for embedding in an IC having programmable logic.

An aspect relates generally to a hardwired core embedded in an integrated circuit. The integrated circuit includes programmable logic that may be coupled to the hardwired core by programming programmable interconnects of the programmable logic. The hardwired core includes: a microprocessor; a crossbar interconnect coupled to processor local buses of the microprocessor; and a memory controller interface coupled to the crossbar interconnect. The crossbar interconnect provides pipelines for coupling the hardwired core to the programmable logic. The memory controller interface is configurable for communication with a memory controller external to the hardwired core and capable of being coupled to the memory controller via the programmable logic of the integrated circuit. The microprocessor, the crossbar interconnect, and the memory controller interface are all capable of operating at a first frequency of operation. The memory controller interface is further capable of being set to operate at a second frequency of operation having an integer ratio with respect to the first frequency of operation. The crossbar interconnect is configured to direct transactions initiated by the microprocessor from one or more of the processor local buses to the memory controller interface for accessing one or more memory devices coupled to the memory controller.

Another aspect relates generally to a hardwired core embedded in an integrated circuit. The integrated circuit has programmable logic, and the programmable logic is capable of being coupled to the hardwired core by programming of programmable interconnects of the programmable logic. For this aspect, the hardwired core includes: a crossbar interconnect; a memory controller interface coupled to the crossbar interconnect; and a first processor local bus interface coupled to the crossbar interconnect. The crossbar interconnect provides pipelines for coupling the hardwired core to the programmable logic. The memory controller interface is configurable for communication with a memory controller external to the hardwired core and is capable of being coupled to the memory controller via the programmable logic of the integrated circuit. The first processor local bus interface is configurable for communication with a peripheral device external to the hardwired core and is capable of being coupled to the peripheral device via the programmable logic of the integrated circuit. The crossbar interconnect is configured for bridging transactions initiated internally in the hardwired core or externally with respect to the hardwired core via the programmable logic to the memory controller interface or the first processor local bus interface.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
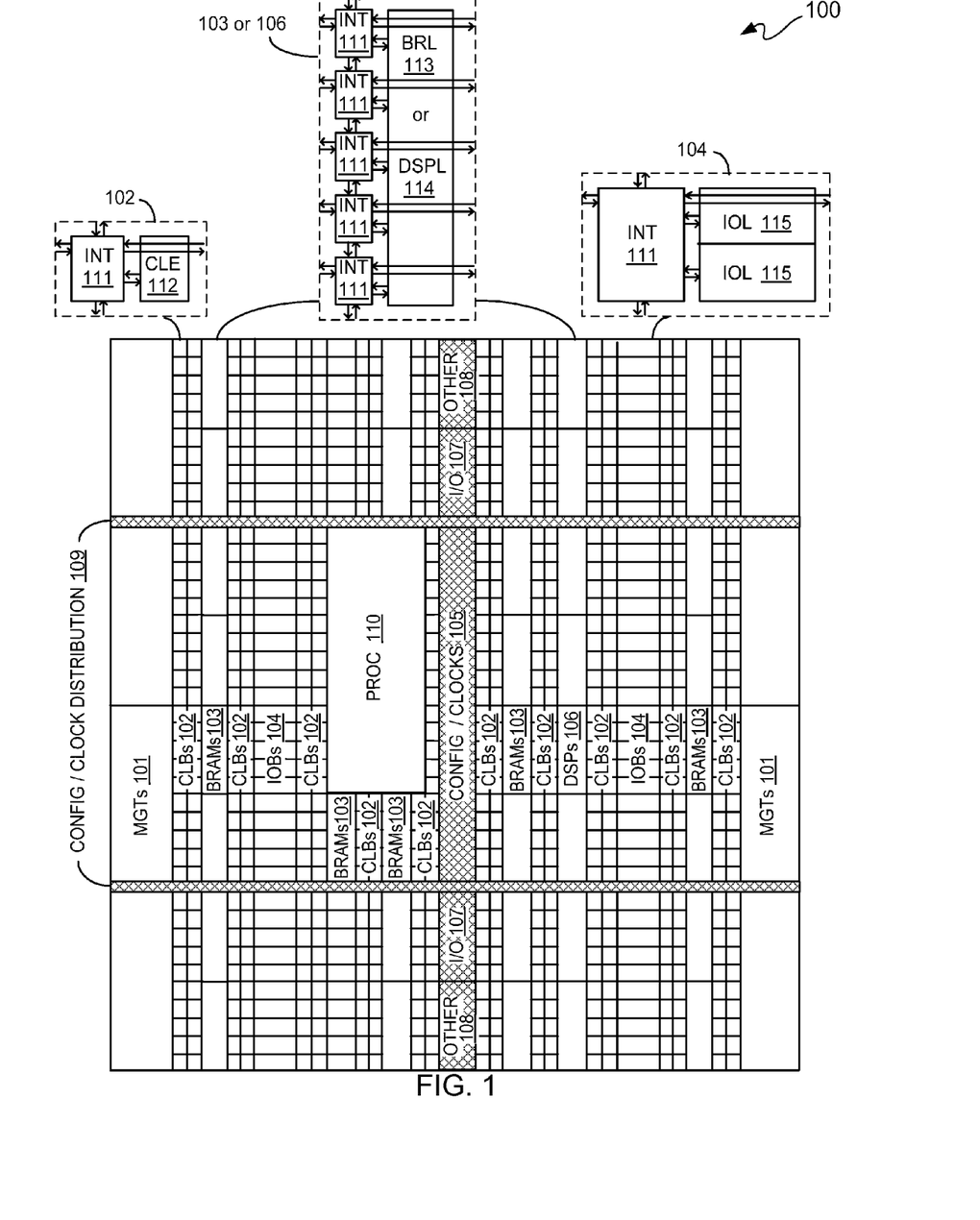
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5™ FPGA available from Xilinx, Inc. of San Jose, Calif., can be programmed to incorporate pre-developed logic blocks with pre-designed functionalities, i.e., "soft cores." A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers generally are not programmable logic.

Moreover, a hardwired core (or "hard core"), such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings or other storage.

Figure 2:
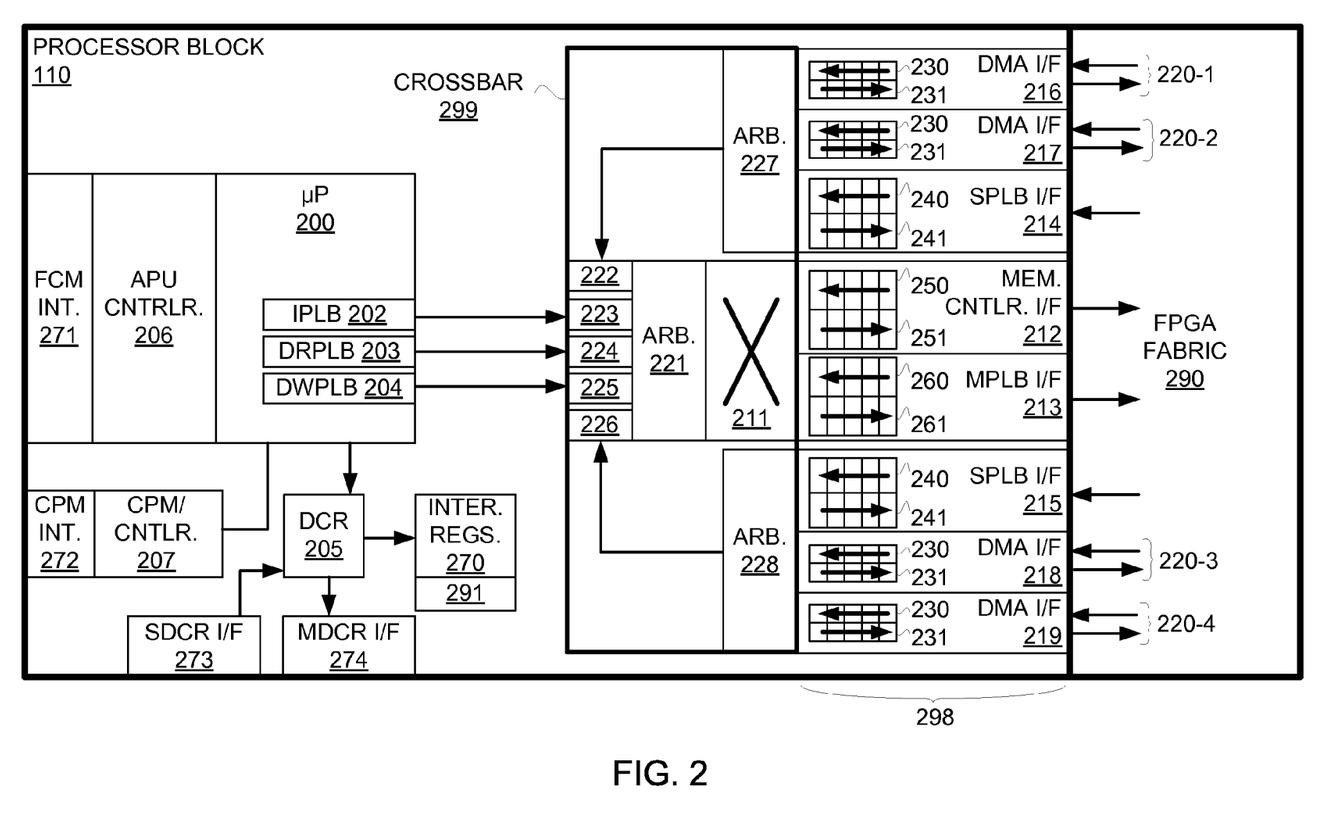
FIG. 2 is a block diagram depicting an exemplary embodiment of an ASIC processor block core ("processor block").

FIG. 2 is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1 in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 may be a Power PC, or more particularly a 440 Power PC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290 to which processor block 110 is coupled. Processor block 110 includes registers, such as internal registers 270, which may be set in order to condition processor block 110 for any of a variety of user selectable configurations, as described below in additional detail.

Either or both an auxiliary processing unit ("APU") control block ("APU controller") 206 and a CPM/control block ("CPM controller") 207 may optionally be coupled to microprocessor 200 as part of processor block 110. A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

DCR block 205 may be coupled to a slave DCR interface ("SDCR interface") 273 and optionally a master DCR interface ("MDCR interface") 274. Thus, a user, a circuit design instantiated in FPGA 290, a microprocessor 200, or some other entity may provide register input to internal registers 270 via SDCR interface 273 subject to control of DCR 205. Alternatively, register input may be provided to SDCR interface 273 under control of DCR 205 for registers (not shown for purposes of clarity) external to processor block 110 coupled via MDCR interface 274. Such external registers may be instantiated in FPGA fabric 290.

Arrows in FIG. 2 indicate the direction of a transaction. Thus, for example, register input provided to DCR 205 may be from a transaction initiated by microprocessor 200 or from a master device (not shown for purposes of clarity) coupled to SDCR interface 273. Such transaction may pass through DCR 205 to MDCR interface 274 or to internal registers 270. One or more master devices, other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 and master PLB interface block ("MPLB interface") 213 may generally be thought of as crossbar 299-to-FPGA fabric 290 bridges.

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212 or MPLB interface 213.

Memory controller interface 212 and MPLB interface 213 are both part of processor block 110. One or more of SPLB interfaces 214 and 215 are part of processor block 110, and one or more of DMA interfaces 216 through 219 may optionally be part of processor block 110.

Crossbar switch 211 is coupled to memory controller interface 212 and MPLB interface 213. Memory controller interface 212 may be coupled to FPGA fabric 290. Likewise, MPLB interface 213 may be coupled to FPGA fabric 290. Thus, for example, microprocessor 200 may issue an instruction transaction, a read transaction, or a write transaction which is respectively decoded by decoder 223, 224, or 225 to provide target addresses, which may be for either or both memory controller interface 212 or MPLB interface 213. A decoded address is used by switch 211 once access to switch 211 for such decoded address is granted by arbiter 221. Thus, switch 211, responsive to a decoded address, provides such address for example to memory controller interface 212, to access a memory controller device coupled thereto, or to MPLB interface 213 to access a peripheral device coupled thereto.

Memory controller interface 212 includes an inbound first-in, first-out buffer ("FIFO") 250 and an outbound FIFO 251. MPLB interface 213 includes an inbound FIFO 260 and an outbound FIFO 261. Each SPLB interface 214 and 215 includes a respective inbound FIFO 240 and an outbound FIFO 241 pair. Lastly, each DMA interface 216 through 219 includes a respective inbound FIFO 230 and outbound FIFO 231 pair. Thus, even though the direction of a transaction is directed to memory controller interface 212 or MPLB interface 213 such as originating from microprocessor 200 or FPGA fabric 290, it should be appreciated that data or other information flow associated with such a transaction may be in either or both input and output directions. Thus, crossbar 299 is bidirectional, as described below in additional detail.

Because processor block 110 is an ASIC core, blocks of processor block 110 that couple to microprocessor 200 may be tailored for interoperability as well as performance. Focusing on communication between microprocessor 200 and memory external to processor block 110, memory controller interface 212 is designed and manufactured to operate at the rated speed of microprocessor 200. Moreover, because of hardwiring associated with an ASIC core, it should be appreciated that latency associated to signal propagation in crossbar 299 and memory controller interface 212 is substantially less than latency in FPGA fabric 290. In other words, by providing an ASIC core with memory controller interface 212 coupled to microprocessor 200, frequency of operation has been increased with a reduction in latency as compared with having microprocessor 200 directly coupled to FPGA fabric.

Moreover, handshaking conventionally associated with a bus layer of a memory controller has been incorporated into memory controller interface 212. Additionally, some functionality conventionally associated with a physical ("PHY") layer of a memory controller is incorporated into memory controller interface 212. These additional functions include address decoding, row and bank detection, transaction reordering, data bus width translation, and burst width translation. Row and bank detection facilitates users to set masks to allow memory controller interface 212 to provide advanced notice of a row or bank miss to a memory controller coupled thereto. Such a miss may cause a stall state, such as time for opening a new page in memory by the memory controller. Accordingly, the memory controller may provide a ready/not ready signal to memory controller interface 212 to on/off throttle output of data therefrom. For example, opening and closing a page or pages in memory is not handled by memory controller interface 212, and is left to a memory controller which may be instantiated in FPGA fabric 290 as determined by a user. Internal registers 270 may be set to configure memory controller interface 212.

For example, memory controller interface 212, prior to setting register bits, does not recognize whether the memory controller is a quad data rate ("QDR"), or double data rate ("DDR"), or single data rate ("SDR"), or some other form of memory. Moreover, memory controller interface 212, prior to setting register bits, does not recognize whether the memory controller is for static random access memory ("SRAM") including BRAM, dynamic random access memory ("DRAM"), read-only memory ("ROM"), flash, or some other type of memory. Coupling slower memory, such as ROM or flash or other form of memory slower than DRAM or SRAM, may be a waste of resource, as such slower memory may be coupled to MPLB interface 213.

Depth of FIFOs 250 and 251 of memory controller interface 212 is fixed, and such depth is sufficient to at least accommodate latency associated with crossbar 290. In other words, depth of FIFOs 250 and 251 is sufficient to handle operations on every cycle of a clock signal (not shown for purposes of clarity), which may be at a frequency of operation of microprocessor 200. Thus, for example, a memory controller instantiated in FPGA fabric 290 coupled to memory controller interface 212 may be configured to send out a "beat" of data on each cycle of operation without any "bubbles."

For purposes of clarity by way of example and not limitation, some numerical examples of bit widths are provided. However, it should be understood that these or other bit widths may be used as may vary from application to application.

If a user decides to burst 1, 4, 8, or 16 quad words at a time, where a word is 32 bits, memory controller interface 212 may be configured to output such quad word bursts. Within processor block 110, the data width of memory controller interface 212 is 128 bits; however, for communication with FPGA fabric 290, memory controller interface 212 interface to FPGA fabric 290 or otherwise external coupling with respect to processor block 110 is user selectable, such as for a 32-, 64-, or 128-bit wide interface. Variable bus sizing of memory controller interface 212 to FPGA fabric 290 is facilitated in part by a bus formed using PIPs of FPGA fabric 290. As shall be appreciated from the following description, any combination of 32-, 64-, and 128-bit soft buses associated with memory controller interface 212 and MPLB interface 213 may communicate with any 32-, 64-, and 128-bit soft buses associated with SPLB interfaces 214 and 215. Furthermore, memory controller interface 212 supports various clocking ratios with respect to frequency of microprocessor 200; examples of such microprocessor-to-memory controller interface clocking ratios may include 1:1, 4:3, 3:2, and 2:1. Additionally, microprocessor 200 may internally operate at a same or different (e.g., faster) frequency than PLB interfaces 202 through 204 thereof. PLB interfaces 202 through 204, however, may operate at the same frequency as crossbar 299. Thus, clocking ratios as described above are with reference to frequency of operation of PLB interfaces 202 through 204 of microprocessor 200.

Effectively, by providing FIFOs 250 and 251, memory controller interface 212 is a FIFO-like port which is clocked at the operating rate of microprocessor 200. There may be as little as a one clock cycle latency, subject to port availability, for sending a decoded address and transaction across crossbar 299 to memory controller interface 212. Likewise, this one clock cycle latency capability across crossbar 299 is applicable to all accesses to crossbar 299 subject to port availability, and is a latency of one clock cycle of a rated speed of operation of microprocessor 200.

Thus, a user design may instantiate a memory controller in FPGA fabric 290 according to the type of memory to be coupled to such memory controller as selected by the user. Accordingly, flexibility for a user design or selection of a memory controller instantiated in FPGA fabric 290 is maintained while performance is enhanced.

PLBs of microprocessor 200 are optionally extended to FPGA fabric via ASIC circuitry provided as one or more of SPLB interfaces 214 and 215 and a MPLB interface 213. However, this is not a mere extension of PLBs of microprocessor 200 because the ASIC circuitry is not merely an extension of wires, but performs additional functions.

MPLB interface 213 operates at a fraction of the rated speed of microprocessor 200, namely approximately one half to one quarter of such rated speed of microprocessor block 200. MPLB interface 213 therefore may load data into outbound FIFO 261 or unload data out of inbound FIFO 260 at the rated speed of microprocessor 200, but data loaded into inbound FIFO 260 and data unloaded from outbound FIFO 261 is at the rated speed of MPLB interface 213. For purposes of clarity by way of example and not limitation, it shall be assumed that the rated speed of operation of microprocessor 200 is approximately 400 to 550 MHz, and the speed of operation of MPLB interface 213 is approximately 133.3 to 183.3 MHz. The clock ratio of the frequency of microprocessor 200 frequency to that of MPLB interface 213 is generally an integer ratio. Frequency of MPLB interface 213, as well as SPLB interface 214 and SPLB interface 215, may have an integer dependency with respect to frequency of crossbar 299. Examples of such frequency dependency crossbar-to-PLB interface may be 1:1, 1:2, 1:3, etc. Crossbar 299 may operate at 1/N (integer) or 2/N ratio of with respect to frequency of microprocessor 200, for N a positive integer greater than zero. Therefore, frequency of operation of MPLB interface 213, as well as SPLB interfaces 214 and 215, may have a non-integer clock ratio with respect to frequency of operation of microprocessor 200.

Accordingly, it should be appreciated that FIFOs, such as FIFOs 250, 251, 260, and 261, as well as command queues (described below in additional detail) of crossbar 299, generally represent respective pipeline channels for bridging transactions, such as from microprocessor 200 to FPGA fabric 290. PLB reading from and writing to microprocessor 200 may be via respective unidirectional channels; however, unidirectional channels associated with PLBs of microprocessor 200 have been combined into bidirectional channels in MPLB interface 213. Thus, MPLB interface 213 is a bidirectional interface using FIFOs 260 and 261 and multiplexer circuitry (not shown for purposes of clarity). Thus, for example, an instruction fetch may be issued via IPLB 202 to memory controller interface 212 via crossbar 299 to read an instruction from memory coupled thereto via a memory controller instantiated in FPGA fabric 290, and at the same time microprocessor 200 may issue a data write via DWPLB 204 to MPLB interface 213 via crossbar 299 to write data to a peripheral device coupled thereto. This may be done concurrently through crossbar 299, as switch 211 has separate sets of connections, namely one set of connections for memory controller interface 212 and one set of connections for MPLB interface 213, such that transactions for memory controller interface 212 and MPLB 213 do not block one another. Moreover, each of these sets of connections is for a 128-bit width, and communication with and within crossbar 299 is configured for a bus width of 128 bits.

Order of transactions is preserved via pipelines and buffers, including a command buffer (not shown for purposes of clarity) for multiple transactions targeted to memory controller interface 212 for example. Likewise, order of transactions is preserved via pipelines and buffers, including another command buffer (not shown for purposes of clarity) for multiple transactions targeted to MPLB interface 213 for example. The side of MPLB interface 213 associated with FPGA fabric 290 is not a FIFO based protocol, but rather is an address/data transaction protocol with a data phase and an address phase.

In addition to memory controller interface 212 which is configurable for a user-specified memory protocol, and MPLB interface 213, which uses a PLB protocol with bidirectional read and write busing, there are additional blocks that increase the interface bandwidth of processor block 110. These additional blocks may include one or more of DMA interfaces 216 through 219 and include one or more of SPLB interfaces 214 and 215. Again, each of DMA interfaces 216 through 219 includes an inbound FIFO 230 and an outbound FIFO 231, and each of SPLB interfaces 214 and 215 includes an inbound FIFO 240 and an outbound FIFO 241.

In this exemplary embodiment, DMA interfaces 216 and 217 and SPLB interface 214 are grouped together for access to decoder 222 via arbiter 227. Likewise, DMA interfaces 218 and 219 and SPLB interface 215 are grouped together for access to decoder 226 via arbiter 228. It should be appreciated that DMA protocols and PLB protocols may be used for coupling to any of a variety of peripheral devices. In this exemplary embodiment, DMAs 216 through 219 are coupled to local links 220-1 through 220-4, respectively. Each local link is a parallel but unidirectional communication bus. In other words, in this exemplary embodiment there are four output local links and four input local links. Input local links may be associated with FIFOs 230 and output local links may be associated with FIFOs 231. Transmit local links are independent of their associated receive local links. A local link, for purposes of this description, may be understood to be a synchronous peer-to-peer unidirectional communication linkage.

In the exemplary embodiment, clock rate of SPLB interfaces 214 and 215 is user settable to an integer ratio with respect to the frequencies of operation of microprocessor 200 and crossbar 299. However, the data rate of communication via local links 220-1 through 220-4 is independent of the clock rate of microprocessor 200 and each other. Thus DMA interfaces 216 through 219 may be asynchronous with respect to crossbar 299; in other words no edge relationship need be present. The side of FIFOs 240, 241, 250, 251, 260, and 261 associated with FPGA fabric 290 generally has a synchronous relationship with respect to crossbar 299, and the side of FIFOs 230 and 231 associated with FPGA fabric 290 generally has an asynchronous relationship with respect to crossbar 299. For purposes of clarity by way of example and not limitation, it shall be assumed that the speed of operation of DMA interfaces 216 through 219 is approximately 200 to 250 MHz, and that the speed of operation of SPLB interfaces 214 and 215 is approximately 133.3 to 183.3 MHz.

In the exemplary embodiment of processor block 110, crossbar 299 is a five-to-two crossbar. In other words, there are five ports, respectively associated with decoders 222 through 226, for coupling to two blocks, respectively memory controller interface 212 and MPLB interface 213. Alternatively, a nine-to-two crossbar may be used or some other crossbar configuration; however, for reasons of anticipated utilization and relative clock rates, a five-to-two crossbar 299 is illustratively shown.

FIFOs of processor block 110, in addition to facilitating adaptation to differences in bandwidth, facilitate processing transactions concurrently by pipelining such transactions. As described below in additional detail, switch 211 is a non-blocking crossbar switch, and once access is granted to switch 211 execution happens immediately. Furthermore, because memory controller interface 212 is capable of operating at the rated frequency of microprocessor 200, having communication to processor block 110 via one or more of DMAs 216 through 219 or one or more of SPLB interfaces 214 and 215, or a combination thereof, is facilitated by having memory controller interface 212 performance enhanced in comparison with other interface blocks of processor block 110, namely SPLB interfaces 214 and 215 and DMA interfaces 216 through 219. Moreover, performance level of memory controller interface 212 is substantially greater than circuits instantiated in CLBs or other programmable logic of FPGA fabric 290.

A master device, for example instantiated in FPGA fabric 290 or another ASIC core of FPGA 100, may be coupled to processor block 110 via an SPLB interface of SPLB interfaces 214 or 215 or a DMA interface of DMA interfaces 216 through 219. Memory controller interface 212 may be thought of as having only one slave device coupled to it, namely memory coupled to it via a memory controller. Furthermore, such a memory controller for interfacing to memory may be substantially simplified as the PHY layer of such memory controller may be directly interfaced with memory controller interface 212. MPLB interface block 213 however is not limited to a single slave device, but may have multiple slave devices coupled to it. This is part of the reason for the slower frequency of operation of MPLB interface 213 in comparison to memory controller interface 212.

Other master devices, such as other ASIC cores, other processors whether instantiated in FPGA fabric 290 or as ASIC cores, or other circuits whether ASIC cores or instantiated in FPGA fabric 290, may be coupled to processor block 110 via any of DMAs 216 through 219 or SPLB interfaces 214 or 215. It is not necessary that all transactions proceed to memory via memory controller interface 212. Thus, a master device may be coupled for example to DMA interface 216 for executing a transaction utilizing a slave device, which may be a memory controller or a peripheral device, coupled to MPLB interface 213. Moreover, a master device coupled to SPLB interface 215 may issue a transaction to a slave device coupled to MPLB interface 213. It should, however, be understood that excluding transactions initiated by microprocessor 200, transactions from master devices coupled to any of DMA interfaces 216 through 219 or any of SPLB interfaces 214 and 215 go into crossbar 299 and then to either memory controller interface 212 or MPBL interface 213 to a memory controller or to one or more other slave devices, respectively, coupled thereto. Moreover, transactions may go from FPGA fabric 290 to memory controller interface 212 or MPBL interface 213. In short, transactions go into and out of crossbar 299 and interfaces 298 of processor block 110, and thus crossbar 299 and interfaces 298 in combination may be thought of as a bridge or bridges.

SPLB interfaces 214 and 215 in combination with MPLB interface 213 support address pipelining. Thus, if a transaction is stalled, other transactions may be stacked up behind it in an output command queue of crossbar 299. There are two output command queues of crossbar 299, namely one for reads and one for writes to allow concurrent read and write transactions as described below in additional detail. Commands waiting in output command queues have completed an address decode phase, and may be waiting on a data phase to begin. At the completion of a data phase for a current command being processed, a next command in a command queue has its data phase initiated, and successive data phases may be initiated without any "dead" cycle between them. It should be understood that outbound FIFOs 251 and 261 facilitate pipelining for adaptation to availability and relative transaction speed of slave devices coupled to memory controller interface 212 and MPLB interface 213, respectively.

There may be local buses inside FPGA 100 that are dedicated. For example, if a slave device is not shared, but rather is receptive to only one master device, then a dedicated local bus may be used. While processor block 110 may be used for such a bridging operation, a local bus may be used instead. However, slave devices may operate with 32, 64, or 128 bit transactions as MPLB interface 213 is not only adaptable to different bus sizes, but is also adaptable to different transaction sizes. Thus, for example, a 32 bit transaction may be performed via a 128-bit soft bus in FPGA fabric 290 coupled to MPLB interface 213. Again, processor block 110 internal busing crossbar 299 for example is 128 bits. For example, a burst of 8 64-bit transfers is a burst of 4 128-bit transfers in crossbar 299. Thus, 32- and 64-bit transactions from soft masters for example are converted to a 128-bit format for processing through crossbar 299. This conversion may include command modification, data mirroring, and steering. Additionally, the conversion may optionally include packing for burst transfers and line transfers to enhance bandwidth efficiency of crossbar 299, namely to enhance usage of the full width of 128-bit internal crossbar 299 buses. Single transfers thus may not be packed.

Transfers may be misaligned. A packet may not be aligned to a quad word. To align transfers, a single word transaction for a larger transfer is performed first, followed by one or more quad word aligned transactions depending on the size of the transfer. These transactions may for example be 8 quad word aligned transactions. If the quad word aligned transactions are too large to end the transfer, a single word transaction or transactions may be used to complete the transfer.

Microprocessor 200 is a master device as it issues transactions for other devices. Furthermore, it should be appreciated that any transactions which originate via a master device coupled to any of DMA interfaces 216 through 219 or SPLB interfaces 214 and 215, or via microprocessor 200 exit processor block 110.

SPLB interfaces 214 and 215, like MPLB interface 213, are 128 bits wide and may be set to operate as 32- or 64-bit wide interfaces. In contrast, DMA interfaces 216 through 219 to FPGA fabric 290 are each 32 bits wide. Moreover, MPLB interface 213 and SPLB interfaces 214 and 215 are dynamic interfaces, as their bus width on a side associated with FPGA fabric 290 may be varied for coupling to a soft bus configured using PIPs of FPGA fabric 290; however, even though DMA interfaces 216 through 219 may be coupled to a soft bus configured using PIPs of FPGA fabric 290, their bus width is fixed at 32 bits.

FPGA fabric 290 generally operates more slowly for example than crossbar 299. Thus, a five-to-two crossbar, rather than a nine-to-two crossbar, may be implemented, where all of DMA interfaces 216 through 219 are operating at full capacity without any apparent "dead cycle" or "bubble." Part of this implementation involves having interface blocks, such as DMA interfaces 216 through 219 and SPLB interfaces 214 and 215, accumulate a threshold amount of data before being granted access to switch 211. Local links 220-1 through 220-4 are dedicated interfaces, not soft buses, and there is no notion of address mapping for local links 220-1 through 220-4. There is flow control signaling for local links, such as ready/not ready signaling.

DMA interfaces 216 through 219 and SPLB interfaces 214 and 215 are "slave" interfaces. More particularly, DMA interfaces 216 through 219 are controlled via a DCR interface, described below in additional detail, for servicing microprocessor 200 or another master device coupled via such a DCR interface. SPLB interfaces 214 and 215 have coupled to them a master device, which is external to processor block 110, such as may be instantiated in FPGA fabric 290. However, memory controller interface 212 and MPLB interface 213 are "slave" interfaces with respect to microprocessor 200, DMA interfaces 216 through 219, and SPLB interfaces 214 and 215, as memory controller interface 212 and MPLB interface 213 each service microprocessor 200, and one or more master devices coupled via DMA interfaces 216 through 219 or SPLB interfaces 214 and 215.

Memory controller interface 212 and MPLB interface 213 are master interfaces with respect to "slave" devices coupled thereto via buses external to processor block 110. DMA interfaces 216 through 219 are scatter gather DMA interfaces. In other words, DMA interfaces 216 through 219 search for descriptor information in memory. This search may involve proceeding down a chain of descriptors, where such descriptors include a starting address and a length. Once a target descriptor is identified, the information at the descriptor in memory is read and provided to the requesting master device. Alternatively, a write to a starting address for a specified length in memory may be done using DMA interfaces 216 through 219. Once one descriptor is processed, another descriptor may automatically be processed, and so on, for this is peripheral-to-memory communication.

Arbiters 227 and 228 may be implemented as round robin arbiters. Thus, for example arbiter 227 may select any of DMA interface 216, DMA interface 217, or SPLB interface 214 in a round robin format. However, for SPLB interfaces 214 and 215 to have a right to request access to switch 211, SPLB interfaces 214 and 215 are to have stored therein a set threshold amount of data ready to be exchanged across switch 211. The threshold level of data may be set by a user. For DMA interfaces 216 through 219, this threshold level of data is not user settable, but rather is fixed by DMA protocol.

It should be appreciated that FIFOs 230, 231, 240, 241, 250, 251, 260, and 261 each have input and output bit widths. Such FIFO bit widths may correspond to bit widths of memory controller interface 212 and MPLB interface 213, namely 128 bits wide for example. However, for communication for example via local links 220-1 through 220-4, such a bit width, such as 128-bit width, may exceed the external communication interface bit width. DMA interfaces may thus be configured to concatenate words onto a line in a FIFO for a write and may be configured to read out an entire line of a FIFO for multiplexing into increments, such as four 32-bit words. Thus, for example, in the receive direction, DMA interface 216 may receive 32 bits at a time via associated local link 220-1 with byte enables on a 128-bit wide bus of an associated FIFO 230 to concatenate such 32-bit words into a 128-bit quad word, namely to fill a line of FIFO 230. In the send direction, DMA interface 216 for example may obtain a 128-bit quad word buffered in a line in FIFO 231 that is read out therefrom as a 128-bit quad word, but bus segmented into four 32-bit words for multiplexing a 32-bit word at a time for sending via associated local link 220-1. FIFOs 230, 231, 240, 241, 250, 251, 260, and 261 may be implemented with latches or flip-flops or a combination thereof. Again, the user may set the threshold amount of data for SPLB interfaces 214 and 215 to request access to switch 211. The minimum a user may set may be one quad word. However, once access is obtained, even if there is a partial quad word to process as part of such data meeting or exceeding a threshold amount, such partial quad word is processed along with the data for which access is granted.

Inbound FIFOs 230, 240, 250, and 260 allow data to be accumulated. Once a threshold amount of data for requesting access to crossbar 299 is accumulated in any of FIFOs 230, 240, 250, and 260, then a request may be made to an arbitration stage for access to crossbar switch 211. DMA interfaces 216 through 219 and SPLB interfaces 214 and 215 have two stages of arbitration for access to crossbar switch 211. The threshold amount of data to be accumulated by SPLBs 214 and 215 may be individually set by register settings. Thus each of SPLBs 214 and 215 may have same, different, or a combination of one or more threshold settings. Such threshold settings include 1, 4, 8, or 16 quad words. Each cache word may be two quad words wide. To reduce request overhead to access switch 211, arbiters 227 and 228 preclude requests until a threshold amount of data has been accumulated in an inbound FIFO. Thus, this is a load balancing-multiplexing protocol. Data flow out of outbound FIFOs 231, 241, 251, and 261 may be dependent upon master devices external to processor block 110, such as may be instantiated in FPGA fabric 290.

As described below in additional detail, register address mapping is configurable for processor block 110, namely for accessing either memory controller interface 212 or MPLB interface 213. Addresses are input to decoders 222 through 226. More particularly, after arbitration via arbiter 227 or 228, an address associated with a transaction to be provided to either memory controller interface 212 or MPLB interface 213 is decoded by decoder 222 or 226, respectively. It should be appreciated that address decoding may be performed before arbitration by arbiter 221, namely address decoding is performed by decoders 222 through 226 before crossbar arbitration by arbiter 221. Additionally, as part of the decoding to select between memory controller interface 212 or MPLB interface 213, there may be additional decoding of an address within the selected interface, namely an address for a slave device coupled to memory controller interface 212 or MPLB interface 213. A decoded address may be provided to arbiter 221 for providing access to switch 211. Arbiter 221 may be configured by user selection for any of a variety of arbitration protocols responsive to register input. Examples of such arbitration protocols include round robin, fixed, and least recently used; however, other arbitration protocols may be used. Arbitration by arbiter 221 and decoding by decoders 222 through 226 may be performed with some degree of parallelism to facilitate a one clock cycle latency as previously described.

Crossbar 299 provides a non-blocking interconnection. Non-blocking means that two different master devices may access two different slave devices simultaneously. For example, a master device in FPGA fabric via one of DMA interfaces 216 through 219 may access memory controller interface 212 simultaneously while microprocessor 200 accesses MPLB interface 213. However, multiple master devices may have multiple transactions that are pipelined to a single interface, such as either or both of interfaces 212 and 213.

Memory mapping may be done with a configuration bitstream to set register values. These register values may be set in internal registers 270. Alternatively, rather than or in addition to setting register values using a configuration bitstream, DCR operations may be used to set register values. However, memory mapping for some user designs may not change, and thus setting register values by configuration bitstream may be sufficient in some applications. Each of memory controller interface 212 and MPLB interface 213 may thus be address programmable.

Moreover, this memory mapping is flexible. It should be understood that because address spaces for a user design to be instantiated into FPGA fabric 290 may vary from user to user, such address spaces are not fixed. Rather, a user may program the memory map for processor block 110 via a configuration bitstream, or alternatively via DCR 205. However, programmed memory address spaces may be changed via DCR 205 after programming via a configuration bitstream. An example of memory mapping may include setting an address in a memory map of memory controller interface 212 for booting microprocessor 200 from flash memory located at such address and coupled to memory controller interface 212. Another example of memory mapping may be setting a portion of the memory address range that may be mapped to MPLB interface 213 for accessing peripherals.

Supported transfer types may include single word, cache line, fixed length burst, and intermediate burst (e.g., end location of bursting transfer not presently known). It should be appreciated that there is a distinction between burst and line data transfers. Line transfers have an architectural identity in that they start at the beginning of a line and go to the end of the line. Thus, for a cache line transfer, access starts from the beginning of the line and goes to the end of the line, whether or not a wraparound condition follows. In contrast burst transfers may start at the beginning of any word on a line at an identified address and continue until an end word is reached. Thus, a burst transfer may, but need not, start at the beginning of a line. Because of the architectural identity of line transfers, line transfers are not translated. However, burst transfers may be translated. Thus, for example long bursts may be translated to fixed short-length bursts by command translation circuitry in SPLB interfaces 214 and 215.

Features set via configuration registers of processor block 110, such as for example threshold data accumulation size, arbitration protocol, address mapping, priority assignment, error handling, and activation/deactivation of write posting, are accessible via SDCR interface 273. SDCR interface 273 is a slave DCR interface that allows the coupling thereto of one or more master devices external to processor block 110. Therefore, transactions generated by external master devices may come through SDCR interface 273 into crossbar 299. On the other hand, MDCR interface 274 is capable of passing generated transactions to one or more soft DCR slave devices, described below in additional detail.

This facilitates use of processor block 110 in a multi-processor system. For example, via SDCR interface 273 and DCR 205 another embedded processor in FPGA 100 or a soft processor instantiated in FPGA fabric 290 may be a master device that uses crossbar 299 and one or more of interfaces 212 and 213, with or without microprocessor 200 being involved. Additionally, default values for configuration of internal registers 270 of processor block 110 may be programmed into configuration memory cells 291 coupled to internal registers 270. Such default values may be programmed into memory cells 291 via a configuration bitstream. Thus, immediately upon a reset of processor block 110, default values may be loaded from memory cells 291 into configuration registers 270.

Each local link 220-1 through 220-4 has a separate receive and separate transmit bus, each of which is 32 bits wide and each of which is independent from one another. Quad words may be aligned as previously described for providing 128 bits to inbound FIFOs 230. A local link, such as of local links 220-1 through 220-4, is either all on or all off, and thus a scatter or gather approach is employed.

Figure 3:
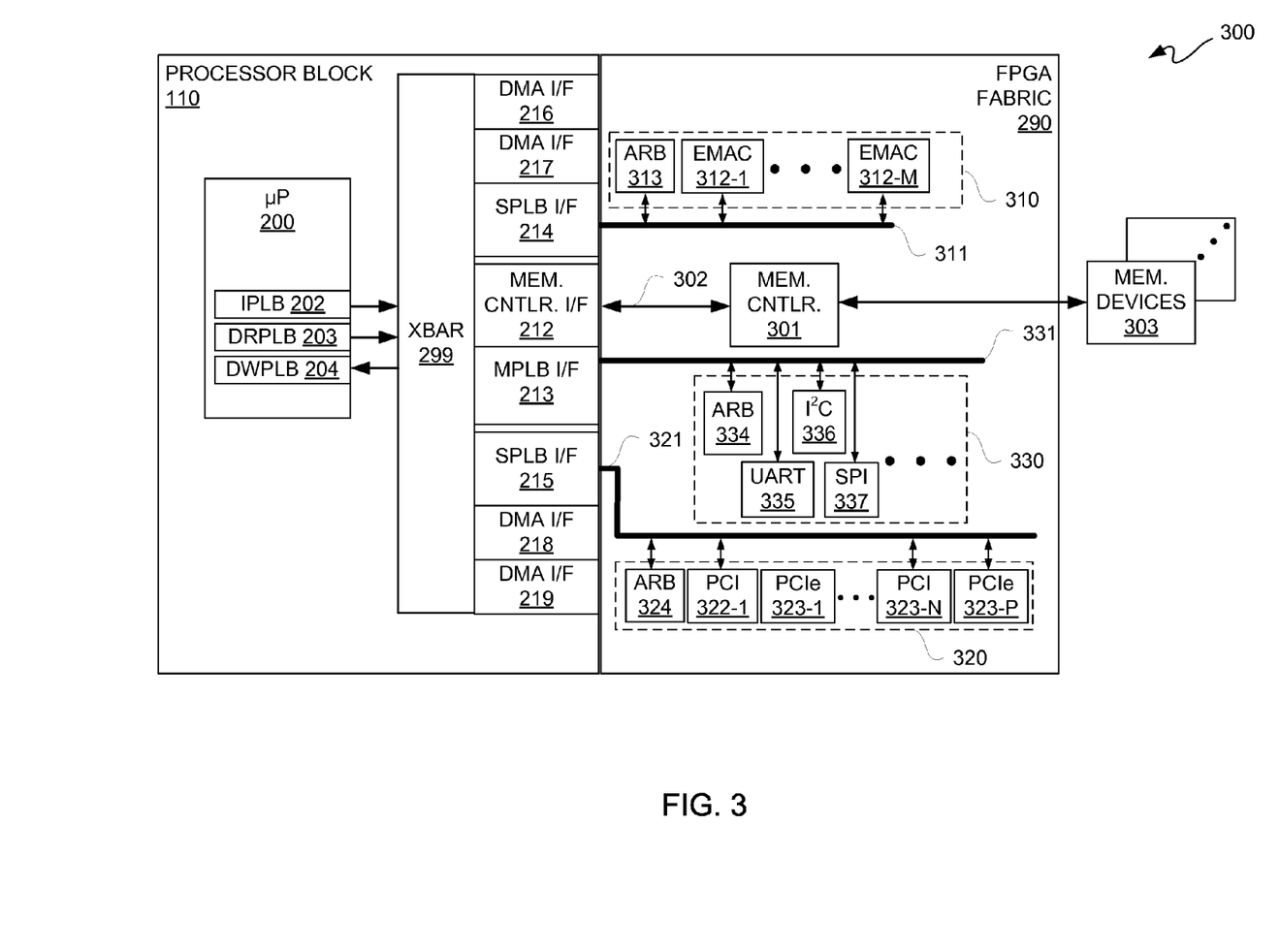
FIG. 3 is a block diagram depicting an exemplary embodiment of a system in which the processor block of FIG. 2 may be used.

FIG. 3 is a block diagram depicting an exemplary embodiment of a system 300 in which processor block 110 may be used. Processor block 110 may be coupled to a memory controller 301 instantiated in FPGA fabric 290. Accordingly, memory controller 301, or at least the portion of that circuit instantiated in programmable logic of FPGA fabric 290, may be thought of as a "soft" memory controller. Memory controller 301 may be coupled to memory controller interface 212 of processor block 110 via soft memory control interface bus 302. Buses 311, 321, and 331 may all be soft buses instantiated using PIPs of FPGA fabric 290. Memory controller 301 may be coupled to one or more memory devices 303, where such one or more memory devices 303 are either internal or external to FPGA 100.

As previously described, master devices may be instantiated in FPGA fabric 290. For example, one or more soft master devices 310 may be coupled to a soft SPLB 311 which is coupled to SPLB interface 214 of processor block 110. Soft SPLB 311 may have coupled to it one or more Ethernet media access controllers ("EMACs") 312-1 through 312-M, for M a positive integer greater than zero. There may be arbitration associated with access to SPLB 311 as indicated by arbitration block 313. EMACs 312-1 through 312-M are master devices, which in this exemplary embodiment are implemented in FPGA fabric 290 as soft master devices. However, it should be understood that one or more hard EMAC master devices may be coupled to SPLB interface 214 via SPLB 311.

Moreover, one or more other soft, or hard, master devices 320 may be coupled to soft SPLB 321 which is coupled to SPLB interface 215. In this example, soft master devices of FPGA fabric 290 are PCI blocks 322-1 through 322-N, and PCI Express blocks 323-1 through 323-P, for N and P positive integers greater than zero. PCI blocks 322-1 through 322-N, and PCI Express blocks 323-1 through 323-P may be coupled to SPLB interface 215 via soft SPLB bus 321. An arbitration block as generally indicated by arbitration block 324 may be used to arbitrate access of PCI blocks 322-1 through 322-N and PCI Express blocks 323-1 through 323-P to SPLB 321.

As previously indicated, MPLB interface 213 is a slave device with respect to switch 211. However, MPLB interface 213 is master device with respect to slave devices coupled to soft MPLB 331. More particularly, one or more hard or soft slave devices may be coupled to soft MPLB 331. In this exemplary embodiment, soft slave devices 330 which are coupled to MPLB 331 are instantiated in FPGA fabric 290. Access to MPLB 331 may be arbitrated by an arbitration block 334. Examples of soft slave devices may include one or more instances of a UART 335, an I²C block 336, an SPI block 337, slave interfaces of master/slave devices (e.g., EMAC, or PCI), or one or more other peripheral devices.

In the exemplary embodiment previously described, crossbar 299 provides command pipelining in command FIFOs for up to five transactions (in each direction) to each of memory controller interface 212 and MPLB interface 213 corresponding to the five master transaction inputs to decoders 222 through 226 of FIG. 2. However, as previously indicated other command queue depths may be used.

Though not illustratively shown for purposes of clarity, hard or soft master devices configured for DMA access may be coupled to DMA interfaces 216 through 219 dedicated local links 220-1 through 220-4, respectively. However, soft buses conforming to DMA protocol may be used rather than dedicated buses. Thus, for example, a hard or soft master device may be coupled to a local link which is coupled to a DMA interface of DMA interfaces 216 through 219 of processor block 110 An example of such a DMA soft or hard master device includes an EMAC, a PCI or PCIe device, among other DMA capable devices.

Figure 4:
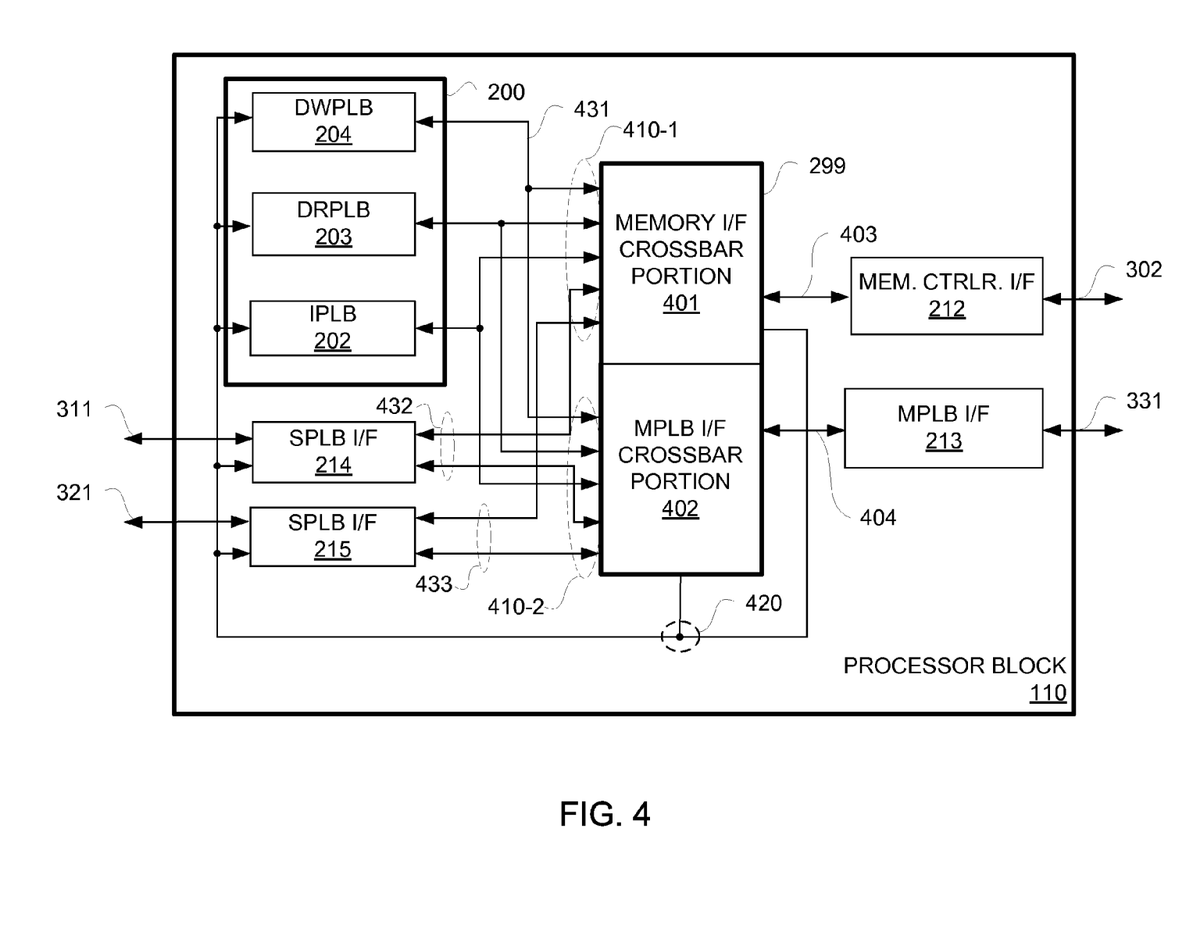
FIG. 4 is a block diagram depicting an exemplary embodiment of an interconnection for the processor block of FIGS. 2 and 3.

FIG. 4 is a block diagram depicting an exemplary embodiment of an interconnection for processor block 110 of FIG. 2. The processor interconnection is described with simultaneous reference to FIG. 2.

DWPLB 204, DRPLB 203, and IPLB 202 of microprocessor 200 are each coupled to memory interface crossbar portion 401 and MPLB crossbar portion 402 of crossbar 299 to provide thereto write data, address, control and arbitration information from microprocessor 200. Additionally, SPLB interfaces 214 and 215 are each coupled to memory interface crossbar portion 401 and MPLB crossbar portion 402 to provide thereto write data, address, control and arbitration information from one or more master devices coupled to such interfaces 214 and 215 respectively via SPLB 311 and SPLB 321.

Portions 401 and 402 have separate arbitration logic, separate read and write command queues, and common crossbar logic, all of which are described below in additional detail. For example, switch 211 is two switches, one for memory interface PLB 403 and one for general purpose PLB 404. For the each of such switches, a respective arbitration block, a read command queue, and a write command queue is hardwired. Decoders 222 through 226 are not illustratively shown, and accordingly it should be understood that address information has been decoded for directing a command to the appropriate location.

Each portion 401 and 402 receives write data, address, control and arbitration information, as generally indicated as master device information input 410-1 and 410-2, collectively and singly information input 410. This is because such information input 410 is from an initiated transaction by a master device, such as microprocessor 200 or a master device coupled to an interface of SPLB interfaces 214 and 215. Such an initiated transaction may be addressed for memory controller interface 212 or MPLB interface 213. DMA interfaces 216 through 219 are not illustratively shown for purposes of clarity and not limitation, as their interconnection shall be understood from the description herein of interconnecting SPLB interfaces 214 and 215.

The same signals sent from DWPLB 204 may be provided to both memory interface crossbar portion 401 and MPLB crossbar portion 402 via a common bus 431. Likewise, respective common buses provide signals from DRPLB 203 and IPLB 202 to both memory interface crossbar portion 401 and MPLB crossbar portion 402. Master interfaces, such as PLB interfaces 202 through 204, are bidirectional to portions 401 and 402 via a common bus for each interface. Additionally, bidirectional buses 432 and 433 may couple SPLB interfaces 214 and 215 to memory interface crossbar portion 401 and MPLB crossbar portion 402. Moreover, a common bidirectional bus may couple SPLB interfaces 214 and 215 to memory interface crossbar portion 401 and MPLB crossbar portion 402.

Provided from portions 401 and 402 to SPLB interfaces 214 and 215 and to DRPLB 203 and IPLB 202 is read data, control, and address acknowledgement information. This output information 420 is from portions 401 and 402 in response to an initiated transaction or command. Thus, even though bused on a common bus, such output information 420 is directed for the initiator block by crossbar logic, such as crossbar logic 506 of FIG. 5, common to portions 401 and 402. Some of this output information 420 is internal handshaking with an initiator block, and some of this output information 420 may be the result of a completed transaction, such as data obtained via MPLB 331 or memory controller interface bus 302. Thus, for example, a completed read transaction of memory coupled to memory controller interface bus 302 provides read data through memory controller interface 212 to memory interface PLB 403 for memory I/F crossbar portion 410 for a transaction initiator block, such as a master device coupled to an interface of SPLB interfaces 214 or 215, or microprocessor 200. Thus, in the response to an initiated transaction by a transaction initiator block, each of SPLB interfaces 214 and 215 and DRPLB 203, DWPLB 204, and IPLB 202 does not receive the same set of output information 420, as such output information 420 may only be provided to the interface associated with the transaction initiator block initiating the transaction resulting in such output information 420.

Figure 5:
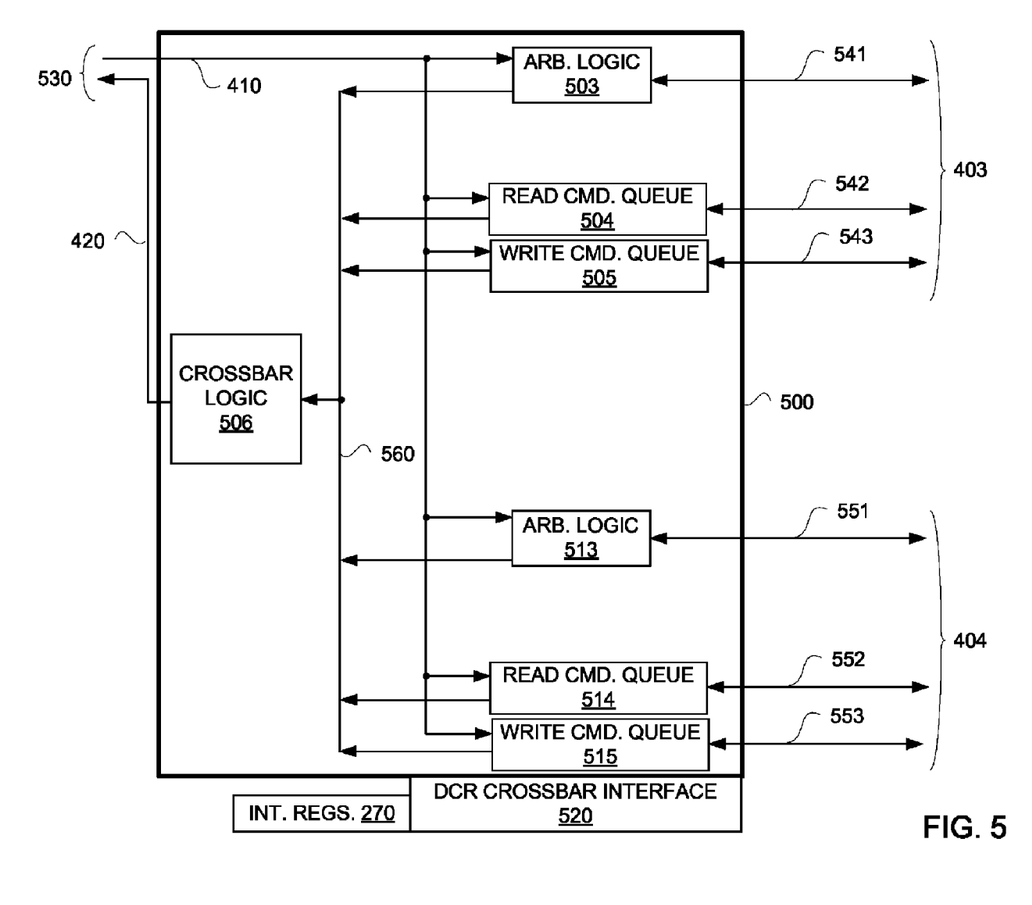
FIG. 5 is a block diagram depicting an exemplary embodiment of a crossbar structure, which may be used for a crossbar of the processor block of FIGS. 2 through 4.

FIG. 5 is a block diagram depicting an exemplary embodiment of a crossbar structure 500, which may be used for crossbar 299 of FIGS. 2 through 4. A two stage decoding process, namely decoding to select between memory controller interface 212 and MPLB interface 213 and decoding for an address of an address map, provides flexibility to a user while simultaneously reducing the number of bits involved to decode a requested address. Crossbar 299 implements address mapping for processor PLB interfaces. For a request originating from SPLB interfaces 214 and 215, SPLB interfaces 214 and 215 pre-decode the request. These SPLB interfaces 214 and 215 provide this information to crossbar 299 via a control signal. Thus, crossbar 299 does not have to decode the address again for inbound communication from for example FPGA fabric 290 in response to an initiated transaction, which improves timing since the address mapping falls on time sensitive paths. For purposes of clarity and not limitation, it shall be assumed that input information 410 includes previously decoded addresses.

A master device 530 provides input information 410 either to a set of blocks associated with memory controller interface bus 403 or a set of blocks associated with general purpose MPLB 404. Each of these sets of blocks generally includes the same circuits, namely the set associated with memory controller interface 212 includes arbitration logic 503, read command queue 504, and write command queue 505, and the set associated with MPLB interface 213 includes arbitration logic 513, read command queue 514, and write command queue 515. Arbitration logic 503, read command queue 504, and write command queue 505 are respectively associated with an address phase 541, a read data phase 542, and a write data phase 543 with respect to communication with memory controller interface 212 via memory controller interface bus 403. Arbitration logic 513, read command queue 514, and write command queue 515 are respectively associated with an address phase 551, a read data phase 552, and a write data phase 553 with respect to communication with MPLB interface 213 via general purpose MPLB 404.

A PLB protocol defines two phases of a transaction, namely an address phase and a data phase, which occur independently on separate buses. When a request is acknowledged by a slave device, namely via an interface 212 or 213, the slave device has committed to provide or accept the data during the data phase of the transaction. A delay may occur before the data phase is started by the slave device. Multiple data phases may additionally be pipelined by slave devices in a system.

To keep track of data phases which are outstanding, crossbar 299 maintains two command queues for each arbiter, namely one for reads, namely read command queues 504 and 514, and the other for writes, namely write command queues 505 and 515. Crossbar 299 uses the information stored in the command queues to direct the slave device data phase responses to the appropriate master device and to determine if its particular transaction has been completed.

After a transaction is completed for example on an FPGA fabric 290 side of such transaction, the result of such transaction is provided back to crossbar structure 500, which may include one or more of an address phase and a data phase via an interface from which the transaction was provided to FPGA fabric 290. However, output from the set of arbitration logic 503, read command queue 504, and write command queue 505 and the set of arbitration logic 513, read command queue 514, and write command queue 515 is commonly bused via output bus 560 for input to crossbar logic 506.

Output of crossbar logic 506 is output information 420, which is provided to master device 530. Each of arbitration logic module, namely arbitration logic 503 and 513, of arbiter 221 may generate its own set of arbitration mask signals with respect to master device signals. These mask signals may be combined together, such as with OR gate logic, for providing output information 420 to the correct transaction originating master device 530. Thus, crossbar logic 506 combines mask signals from a memory interface arbiter and an MPLB arbiter respectively of arbitration logic 503 and 513, and sources the resulting output to a requesting master device. When a master device, whether microprocessor 200 or a master device instantiated in FPGA fabric 290 for example, coupled to crossbar 299 requests a transaction to be performed, the identity of the requesting master device is temporarily stored with any other stored identities, in memory controller interface 212 or MPLB interface 213 depending on the transaction. The stored identity of a requesting master device may be used to steer returned data or control information, resulting from execution of such a transaction, to the requesting master device. The master device identity may be used to generate mask bits that control this steering.

Read and write command queues facilitate pipelining read and write data phases. For purposes of clarity by way of example and not limitation as previously described, read and write command queues may each be five deep and hence up to five read and four write data phases may be outstanding for any slave bus, namely buses 403 and 404. Of course even though the example depth of such command queues is five, other depths less than or greater than five may be used. If a master device issues a transaction which has or is granted access to crossbar 299, crossbar 299 arbitrates via arbitration logic 503 or 513, respectively, between such transaction and one or more other transactions from other master devices requesting use of a same interface of interfaces 212 and 213, respectively. A winner is ascertained within the same clock cycle and the request is put out on the slave address bus, and the byte enable ("BE") and size transfer qualifiers are pushed into a crossbar command FIFO, namely a read or write command queue as described above. Once a data phase of a transaction has been completed, the command FIFO is popped and used to redirect the transaction response signals from the slave device to the correct master device.

Crossbar structure 500 may be coupled to crossbar-DCR interface 520. As previously described, internal registers 270, which may be coupled to crossbar structure 500, may be set to configure crossbar 299, as well as interfaces 298.

Figure 6:
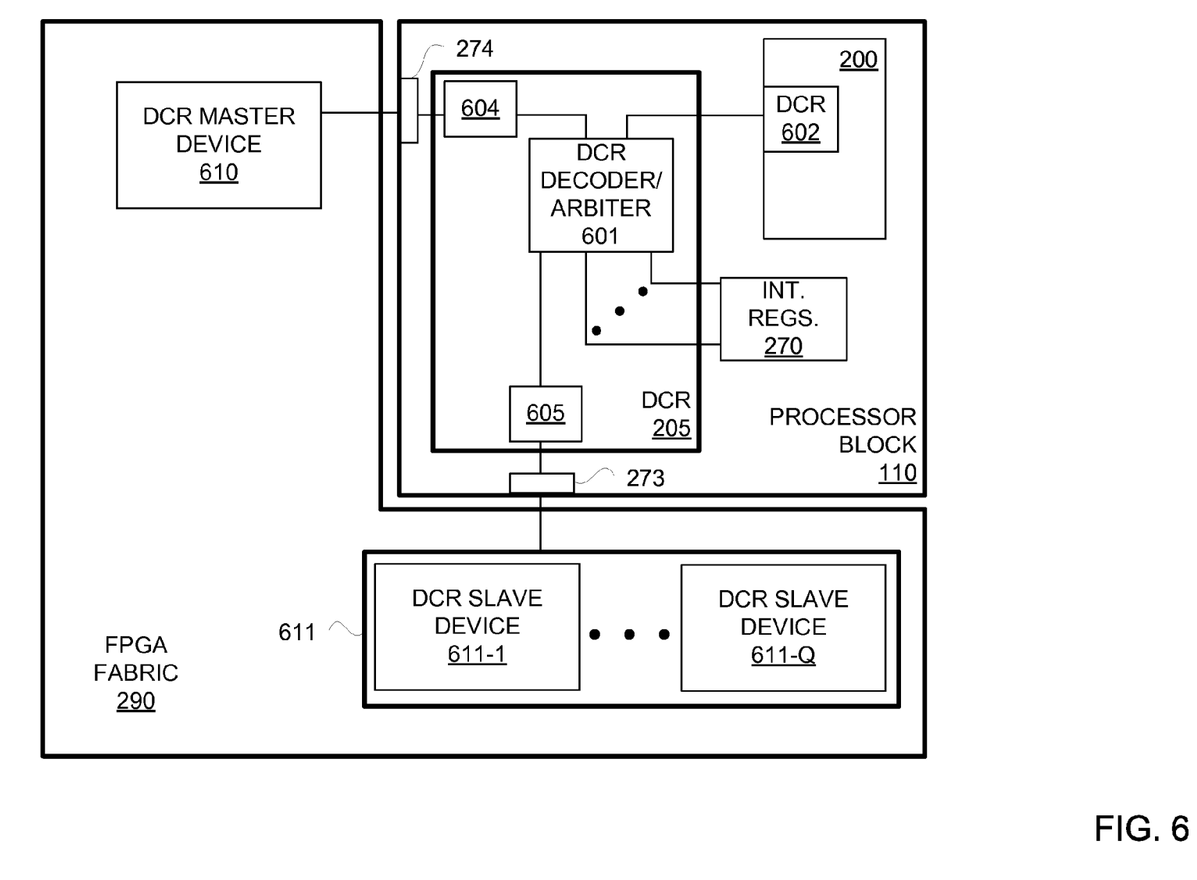
FIG. 6 is a block diagram depicting an exemplary embodiment of the processor block of FIGS. 2 through 4 coupled to devices of a device control register block ("DCR").

FIG. 6 is a block diagram depicting an exemplary embodiment of processor block 110 coupled to DCR devices. Microprocessor 200 includes a DCR port 602, and DCR port 602 may be coupled to DCR decoder/arbiter ("decoder") 601 of DCR 205. DCR decoder 601 is coupled to internal registers 270, and is coupled to a master synch block 604, and a slave synch block 605. Master synch block 604 is coupled to DCR master interface 274. DCR master interface 274 may be coupled to a soft DCR master device, namely a DCR master device 610 instantiated in FPGA fabric 290.

Slave synch block 605 is coupled to DCR slave interface 273. DCR slave interface 273 may be coupled to one or more soft DCR slave devices 611, namely DCR slave devices 611-1 through 611-Q for Q a positive integer greater than zero, instantiated in FPGA fabric 290.

A DCR transaction initiated by a DCR master, namely microprocessor 200 or soft DCR master 610, may be partially decoded by decoder 601, which may include arbitration logic to arbitrate among DCR masters. Such a DCR transaction may be for one or more of DCR slave device 611-1 through 611-Q or may be for setting or resetting configuration of internal status and configuration registers, namely internal registers 270.

If such DCR transaction is for DCR crossbar interface 520 as determined after partially decoding, then such partially decoded DCR transaction is presented to DCR crossbar interface 520 of FIG. 5. The PLB address range is independent of the DCR address range associated for example with DCR slave devices 611. Thus, soft DCR master device 610 may read or modify configuration of crossbar 299 and interfaces 298 by issuing DCR read or write commands, respectively. Moreover, soft DCR master device 610 may issue one or more transactions for one or more of soft DCR devices 611.

It should be understood that decoder 601 partially decodes commands to obtain one or more addresses for configuration settings for crossbar 299 or interfaces 298. However, decoder 601 may fully decode commands to obtain addresses and other information for soft DCR slave devices 611.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A hardwired core embedded in an integrated circuit, the hardwired core comprising:
    a microprocessor, wherein the integrated circuit comprising the hardwired core with the microprocessor comprises programmable circuitry capable of being coupled to the hardwired core by programming of programmable interconnects of the programmable circuitry, wherein the programmable circuitry is programmable to implement a user circuit design;
    a crossbar interconnect coupled to processor local buses of the microprocessor;
    the crossbar interconnect providing pipelines for coupling the hardwired core to the programmable circuitry;
    a memory controller interface coupled the crossbar interconnect;
    the memory controller interface configurable for communication with a memory controller external to the hardwired core and capable of being coupled to the memory controller via the programmable circuitry of the integrated circuit;
    the microprocessor, the crossbar interconnect, and the memory controller interface all capable of operating at a first frequency of operation;
    the memory controller interface further capable of being set to operate at a second frequency of operation having an integer ratio with respect to the first frequency of operation, wherein the second frequency is different from the first frequency; and
    the crossbar interconnect configured to direct first transactions initiated by the microprocessor from one or more of the processor local buses to the memory controller interface for accessing one or more memory devices coupled to the memory controller.

2. The hardwired core according to claim 1, further comprising:
    a first processor local bus interface coupled to the crossbar interconnect;
    the first processor local bus interface configurable for communication with a peripheral device external to the hardwired core and being capable of being coupled to the peripheral device via the programmable circuitry of the integrated circuit; and
    the crossbar interconnect configured to direct second transactions initiated by the microprocessor from one or more of the processor local buses to the first processor local bus interface for accessing the peripheral device.

3. The hardwired core according to claim 2, further comprising:
    a second processor local bus interface coupled to the crossbar interconnect;
    the second processor local bus interface configurable for communication with a first transaction-issuing device external to the hardwired core coupled to the second processor local bus interface via the programmable circuitry of the integrated circuit;
    the crossbar interconnect configured to direct third transactions initiated by the first transaction-issuing device to the first processor local bus interface for accessing the peripheral device; and
    the crossbar interconnect further configured to direct fourth transactions initiated by the first transaction-issuing device to the memory controller interface for accessing the one or more memory devices coupled to the memory controller.

4. The hardwired core according to claim 3, further comprising:
    a direct memory access interface coupled to the crossbar interconnect;
    the direct memory access interface configurable for communication with a second transaction-issuing device external to the hardwired core coupled to the direct memory access interface via dedicated buses of the integrated circuit;
    the crossbar interconnect configured to direct fifth transactions initiated by the second transaction-issuing device to the first processor local bus interface for accessing the peripheral device; and
    the crossbar interconnect further configured to direct sixth transactions initiated by the second transaction-issuing device to the memory controller interface for accessing the one or more memory devices coupled to the memory controller.

5. The hardwired core according to claim 4, wherein:
    the crossbar interconnect is configured to arbitrate between the third, fourth, fifth, and sixth transactions for an opportunity to access a crossbar switch of the crossbar interconnect; and
    the crossbar interconnect is further configured to arbitrate access to the crossbar switch between the first and second transactions having opportunity to access the crossbar switch and the third, fourth, fifth, and sixth transactions having been granted opportunity to access the crossbar switch.

6. The hardwired core according to claim 3, wherein:
    the crossbar interconnect is configured to decode address information associated with the first, second, third, and fourth transactions;
    the address information in part for selecting the memory controller interface or the first processor local bus interface and in part for identification of address spaces associated with the one or more memory devices or the peripheral device, respectively;
    the crossbar interconnect is further configured to arbitrate access to the crossbar switch between the first, second, third and fourth transactions.

7. The hardwired core according to claim 6, wherein the crossbar interconnect includes:
    a memory interface arbiter having first arbitration circuitry, a first read command queue, and a first write command queue respectively associated with a first address phase, a first read data phase, and a first write data phase for those of the first, second, third, and fourth transactions directed to the memory controller interface; and
    a processor local bus arbiter having second arbitration circuitry, a second read command queue, and a second write command queue respectively associated with a second address phase, a second read data phase, and a second write data phase for those of the first, second, third, and fourth transactions directed to the first processor local bus interface.

8. The hardwired core according to claim 7, wherein the crossbar interconnect is configured for concurrent read and write transactions originating from different master devices including the microprocessor and the first transaction-issuing device to different slave devices including the memory controller and the peripheral device.

9. The hardwired core according to claim 7, wherein:
the crossbar circuitry is configured to logically combine mask signals of the first arbitration circuitry and the second arbitration circuitry for sourcing a resulting output to a requesting master device;
the master device capable of being the microprocessor or the first transaction-issuing device; and
the resulting output being responsive to completion of a transaction of the first, second, third, and fourth transactions.

10. The hardwired core according to claim 3, wherein the memory controller interface, the first processor local bus, and the second processor local bus interface are each configurable for dynamically adjustable bus widths for coupling to the programmable circuitry of the integrated circuit.

11. The hardwired core according to claim 10, wherein the dynamically adjustable bus widths are selectable from 32, 64, and 128 bit bus widths.

12. The hardwired core according to claim 3, wherein the crossbar interconnect, the memory controller interface, the first processor local bus, and the second processor local bus interface are each configurable responsive to setting of configuration registers internal to the hardwired core.

13. The hardwired core according to claim 12, wherein:
the configuration registers are capable of being set responsive to first settings in a configuration bitstream; and
the configuration bitstream is capable of including design information for programming the programmable circuitry of the integrated circuit with the user circuit design.

14. The hardwired core according to claim 13, further comprising:
a device control register decoder;
a master device control register interface and a slave device control register interface respectively coupled to the device control register decoder; and
the configuration registers capable of being set or reset responsive to second settings provided via the master device control register interface.

15. The hardwired core according to claim 14, wherein:
the master device control register interface is capable of having a device control register master coupled thereto; and
the device control register master coupled is capable of issuing a device control register command to the master device control register interface for decoding by the device control register decoder.

16. The hardwired core according to claim 15, wherein:
the device control register decoder is configured to set the configuration registers responsive to the second register settings and further configured to arbitrate among device control register masters including the device control register master.

17. The hardwired core according to claim 16, wherein:
the device control register master devices include the microprocessor and a soft device control register master device instantiated in the programmable circuitry; and
the device control register decoder is further coupled to the microprocessor via a device control register port of the microprocessor.

18. The hardwired core according to claim 17, wherein:
the processor local bus address range is independent of a device control register address range associated with one or more soft device control register slave devices instantiated in the programmable circuitry and coupled to the device control register decoder via the slave device control register interface; and
the integrated circuit is a programmable device.

19. A hardwired core embedded in an integrated circuit, the hardwired core comprising:
a crossbar interconnect, wherein the integrated circuit comprising the hardwired core with the crossbar interconnect comprises programmable circuitry capable of being coupled to the hardwired core by programming of programmable interconnects of the programmable circuitry, wherein the programmable circuitry is programmable to implement a user circuit design;
the crossbar interconnect providing pipelines for coupling the hardwired core to the programmable circuitry;
a memory controller interface coupled to the crossbar interconnect;
the memory controller interface configurable for communication with a memory controller external to the hardwired core and capable of being coupled to the memory controller via the programmable circuitry of the integrated circuit;
a first processor local bus interface coupled to the crossbar interconnect;
the first processor local bus interface configurable for communication with a peripheral device external to the hardwired core and capable of being coupled to the peripheral device via the programmable circuitry of the integrated circuit; and
the crossbar interconnect configured for bridging transactions initiated internally in the hardwired core or externally with respect to the hardwired core via the programmable circuitry to the memory controller interface or the first processor local bus interface.

20. The hardwired core according to claim 19, further comprising:
a microprocessor having processor local buses;
the crossbar interconnect coupled to the processor local buses of the microprocessor;
a second processor local bus interface coupled to the crossbar interconnect;
the second processor local bus interface configurable for communication with a transaction-issuing device external to the hardwired core coupled to the second processor local bus interface via the programmable circuitry of the integrated circuit;
the crossbar interconnect configured for bridging the transactions internally generated by the microprocessor and for bridging the transactions externally generated by the transaction-issuing device as follows:
the crossbar interconnect configured to direct first transactions initiated by the microprocessor from one or more of the processor local buses to the first processor local bus interface for accessing the peripheral device or the memory controller interface for accessing one or more memory devices coupled to the memory controller; and
the crossbar interconnect further configured to direct second transactions initiated by the transaction-issuing device to the first processor local bus interface for accessing the peripheral device or to the memory controller interface for accessing the one or more memory devices coupled to the memory controller.

* * * * *